United States Patent Office 3,538,083
Patented Nov. 3, 1970

---

3,538,083
SYNTHETIC METHOD FOR PREPARING PENICILLINS
Norman H. Grant, Wynnewood, Donald E. Clark, Norristown, and Harvey E. Alburn, West Chester, Pa., assignors to American Home Products Corporation, New York, N.Y., a corporation of Delaware
No Drawing. Filed Dec. 19, 1967, Ser. No. 691,694
Int. Cl. C07d 99/16
U.S. Cl. 260—239.1
6 Claims

ABSTRACT OF THE DISCLOSURE

Process for preparing α-aminoacylamino penicillanic acids having antibiotic activity, by reacting 6-aminopenicillanic acid or a salt thereof with certain non-labile N-carboxy anhydrides in an organic solvent medium under reflux conditions and in the presence of an organic amine.

BACKGROUND OF THE INVENTION

The invention relates generally to the art of preparing organic chemicals, and more particularly, to the synthesis of α-aminoacylamino penicillanic acids having antibiotic activity.

In U.S. Pat. 2,985,648 there is disclosed a method for producing α-phenyl-α'-aminoacylamino penicillanic acids, including aminobenzyl penicillin (ampicillin) by reacting 6-aminopenicillanic acid with an α-aminobenzyl acid halide or anhydride, in which the amino group has previously been provided with a protecting acyl group, such as $PhCH_2CO-$, or some other functionally equivalent protecting group. To recover the desired α-aminobenzyl penicillanic acid derivative, it is necessary, subsequently to the acylation of the 6-aminopenicillanic acid by an acylating agent as described, to remove the protecting group from the amino group by catalytic hydrogenation under sufficiently mild conditions to avoid destruction of the penicillin nucleus. Thus, in accordance with this known method, it is necessary to proceed through four separate operational steps as follows: (1) the amino group of the acylating agent to be used has to be blocked with a protecting acyl group, (2) the anhydride has to be formed from the protected amino acid, (3) the protected anhydride has to be reacted with 6-aminopenicillanic acid, and finally, (4) the protecting group has to be removed by catalytic hydrogenation to obtain the desired penicillanic acid derivative.

In U.S. Pat. 3,080,356, there is disclosed a method of producing α-aminobenzyl penicillins by reacting N-carboxy anhydrides with 6-aminopenicillanic acids in an anhydrous organic solvent. However, as cautioned in the patent, the reaction must be carried out at a temperature below about —30° C. owing to the acknowledge extremely unstable character of the N-carboxy anhydrides (Leuch's anhydrides) therein described.

British patent specification No. 958,824 and Portuguese Pat. No. 40,063 similarly disclose processes for preparing α-amino penicillins by reacting N-carboxyanhydrides with 6-amino-penicillanic acid, but in both the methods described in said patents, a mixture of water-miscible organic solvents and water is required. Moreover, the Portuguese patent is limited to α-aminobenzyl penicillins and requires the reaction temperature to be below 20°.

In U.S. Pat. 3,206,455 and U.S. Pat. 3,494,802, methods are shown for preparing compounds of the type to which the present invention pertains. However, both patents describe the reaction in a totally aqueous environment under restrictive conditions of pH.

SUMMARY OF THE INVENTION

The present invention, in its broadest aspect, comprises the synthesis of penicillins by reaction of certain N-carboxy amino acid anhydrides (NCA's) with 6-aminopenicillanic acid (6–APA). More specifically, the present invention involves a synthesis of 6-(1-aminocycloalkylcarboxamido)penicillanic acids by reaction of the corresponding NCA with 6–APA in an organic solvent in which the 6–APA has been dissolved or dispersed with the aid of an organic base. The method may be carried out advantageously under conditions of temperature easily achieved and maintained in a production plant.

DESCRIPTION OF THE INVENTION

The present invention comprises a process for producing 6-(1-aminocycloalkylcarboxamido)penicillanic acids of the following formula:

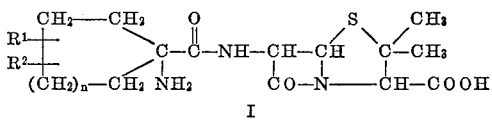

I wherein $n$ is an integer from 0 to 4, and $R^1$ and $R^2$ are each selected from the group consisting of hydrogen, lower alkyl, lower alkoxy, halogen and nitro; which method comprises; preparing a mixture of an N-carboxyanhydride of the following formula:

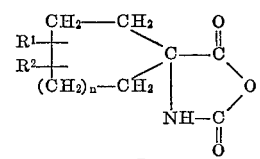

II wherein each of $n$, $R^1$ and $R^2$ have the same meaning as in Formula I above, and 6-aminopenicillanic acid, in an anhydrous organic solvent of the group consisting of chlorinated hydrocarbons, esters, ketones and ethers, having dissolved therein an amine of the group consisting of di(lower)alkyl and tri(lower)alkyl amines; and thereafter refluxing said mixture to obtain a compound of Formula I above.

The N-carboxyanhydrides suitable for use in the process of the present invention may be prepared by any of the methods referred to in U.S. Pat. 3,206,455, and preferably by the phosgenation procedure specifically described therein. The 6-aminopenicillanic acid may be prepared by the method also referred to in said patent or by any of the many other methods now known in the art. The anhydrous organic solvents useful as the reaction media for the method of invention, while not limited thereto, may be, for example, methylene chloride, chloroform, ethyl acetate, dioxane, acetone, and the like. The amine may be any di(lower)alkyl or tri(lower)alkyl amine, such as the commercially available diethylamine, dimethylamine, triethylamine, trimethylamine, dioctylamine and trioctylamine.

The following examples are illustrative of various modes of exercising the method of invention, but are not to be considered necessarily limitative thereof.

EXAMPLE 1

A mixture of 10 g. of 6–APA, 70 ml. of methylene chloride, and 6.4 ml. of triethylamine was refluxed for 15 minutes. A solution of 5.6 g. of the NCA of 1-aminocyclohexane carboxylic acid in 30 ml. of methylene chloride was then added and refluxing allowed to continue for two hours. After standing overnight at 1° the system was filtered, and the filtrate was added to 200 ml. of ethyl acetate. After concentration to about 20 ml., 2.7 ml. of glacial acetic acid in 50 ml. of ethyl acetate was added. The suspension was chilled and filtered. The product, 6-(1-aminocyclohexanecarboxamido)penicillanic acid, was washed with ethyl acetate and dried, giving a weight of 8.25 g.

EXAMPLE 2

A mixture of 10 g. of 6-APA, 70 ml. of methylene chloride, and 6.4 ml. of triethylamine was stirred at room temperature for 2 hours and then filtered. The filtrate was brought to 100 ml. with methylene chloride, and 5.3 g. of the NCA of 1-aminocyclohexane carboxylic acid was added. After 21 hours of stirring, assay showed that 60% of the NCA was still unreacted. After a total of 45 hours this amount of NCA still remained, showing the need for reaction at higher temperatures. After a total of 5 days, however, the reaction was essentially complete, as determined by hydroxamic acid assay. The mixture was filtered, 270 m. of ethyl acetate was added, and the solution was concentrated to a volume of 200 ml. Precipitation of the product followed addition of 2.8 ml. of glacial acetic acid and chilling below room temperature. The product, 6-(-aminocyclohexane carboxamido)-penicillanic acid, was effective against *Staphylococcus aureous* strains 6538P and CHP and against *Escherichia coli* strains 6880 and 11370.

EXAMPLE 3

A mixture of 10.8 g. of 6-APA, 70 ml. of methylene chloride, and 14 ml. of triethylamine was stirred at room temperature for 2 hours. There was then added 8.5 g. of the NCA of 1-aminocyclohexane carboxylic acid and 3 ml. of glacial acetic acid, and the reaction mixture was refluxed for 3 hours. The solution was cooled, added to 200 ml. of dioxane, concentrated to 84 ml., and then acidified with 3 ml. of glacial acetic acid. The system was then mixed with 300 ml. of ethyl ether and the resulting precipitate was removed and dried. This weighed 16.8 g. and assayed as 50% pure 6-(1-aminocyclohexanecarboxamido)penicillanic acid by hydroxamate assays.

EXAMPLE 4

A mixture of 10 g. of 6-APA,, 100 ml. of methylene chloride and 6.4 ml. of triethylamine was stirred at room temperature for 1 hour. There was then added 5.3 g. of the NCA of 1-aminocyclohexane carboxylic acid and the system was refluxed for 2 hours. The mixture was stored overnight in the refrigerator, and a precipiate was removed and discarded. An additional 0.7 g. of NCA was added to the filtrate, and the solution was refluxed for another hour. It was then mixed with 200 ml. of ethyl acetate, concentrated to 75 ml., and finally acidified with 3 ml. of glacial acetic acid in ethylacetate. After chilling, a precipitate weighting 8.6 g. was collected. Addition of ether to the filtrate gave an additional 3.0 g. The combined produce at this stage was 65% pure 6-(-aminocyclohexanecarboxamido)penicillanic acid by hydroxamate assays.

EXAMPLE 5

A mixture of 10 g. of 6-APA, 100 ml. of methylene chloride, and 6.4 ml. of triethylamine was stirred at room temperature for 2 hours. Then 5.52 g. of the NCA of 1-aminocyclopentane carboxylic acid was added, and the reaction mixture was refluxed for 4 hours. After sitting at room temperature for 13 hours, the system was filtered. There was then added to the filtrate 150 ml. of isopropanol, the system was concentrated to 60 ml., and an additional 40 ml. of isopropanol was added. After addition of 30 ml. of ethyl ether and 2.8 ml. of glacial acetic acid, the product precipitated. After washing with ether and drying, it weighed 14.8 g. and was 64% pure 6-(1-aminocyclopentanecarboxamido)penicillanic acid by hydroxamate assay.

EXAMPLE 6

A mixture of 10 g. of 6-APA, 100 ml. of methylene chloride, and 6.4 ml. of triethylamine was stirred at room temperature for 2 hours. There was then added 5.1 g. of 1-aminocyclobutane carboxylic acid NCA, and the reaction mixture was refluxed for 2 hours. It was then cooled to room temperature and filtered. There was then added to the filtrate 300 ml. of ethyl acetate, and the entire mixture was concentrated to 160 ml. This was followed by addition of 2.7 ml. of glacial acetic acid and chilling. The production which precipitated as 6-(1-aminocyclobutanecarboxamido)penicillanic acid weighed 9 g. and was active against *Bacillus subtilis* 6633, *Staphylococcus aureus* 6538P, and *Esherichia coli* 11370.

EXAMPLE 7

A mixture of 10 g. of 6-APA, 100 ml. of methylene chloride, 6.4 ml. of triethylamine, and 6.5 g. of the NCA of 1-aminocycloheptane carboxylic acid was refluxed for 10 hours and then allowed to sit at room temperature for 8 hours. The system was then filtered and 300 ml. of ethyl acetate was added to the filtrate. The resulting suspension was concentrated to 125 ml. An additional 75 ml. of ethyl acetate was added, followed by 2.7 ml. of glacial acetic acid; the system was stored in the cold for 5 hours. The precipitating product comprising 6-(1-aminocycloheptanecarboxamido)penicillanic acid weighed 11.5 g. and was active against *Staphylococcus aureus* strains 6538P, 63–180 and CHP.

EXAMPLE 8

The procedure of Example 7 is followed, but the substitution for the NCA of 1-aminocycloheptane carboxylic acid, the respective NCA's listed in Table A below, to obtain the corresponding penicillins which are active antibiotically:

| N-carboxyanhydride | Corresponding penicillin |
|---|---|
| 1-amino-2-ethyl-cycloheptane carboxylic acid | 6-(1-amino-2-ethyl-cycloheptanecarboxamido)penicillanic acid. |
| 1-amino-3-methyl-4-ethoxycyclohexane carboxylic acid | 6-(1-amino-3-methyl-4-ethoxycyclohexanecarboxamido) penicillanic acid. |
| 1-amino-2-propyl-3-chlorocyclopentane carboxylic acid | 6-(1-amino-2-propyl-3-chloro-cyclopentanecarboxamido) penicillanic acid. |
| 1-amino-3-nitro-cyclohexane carboxylic acid | 6-(1-amino-3-nitro-cyclohexanecarboxanecarboxamido)penicillanic acid. |
| 1-amino-3-bromo-cyclohexane carboxylic acid | 6-(1-amino-3-bromo-cyclohexanecarboxamido)penicillanic acid. |
| 1-amino-3-fluoro-cyclohexane carboxylic acid | 6-(1-amino-3-fluoro-cyclohexane carboxamido)penicillanic acid. |
| 1-amino-2-methyl-cyclobutane carboxylic acid | 6-(1-amino-2-methyl-cyclobutanecarboxamido)penicillanic acid. |
| 1-amino-2-propoxy-cyclohexane carboxylic acid | 6-(1-amino-2-propoxy-cyclohexanecarboxamido)penicillanic acid. |

Example 9

The procedure of Example 1 is again followed in a series of four separate runs, but with the substitution for the methylene chloride solvent in each run, of the same volume, respectively, of chloroform, ethyl acetate, acetone and dioxane as solvents; in each instance to obtain 6-(1-aminocyclohexane carboxamido)penicillanic acid.

Example 10

The procedure of Example 1 is again followed in a series of five separate runs, but with the substitution for the amine in each run, of the same volume, respectively, of dimethylamine, diethylamine, trimethylamine, dioctylamine and trioctylamine.

We claim:
1. A process for producing a 6-(1-aminocycloalkyl-carboxamido)-penicillanic acid of the following formula:

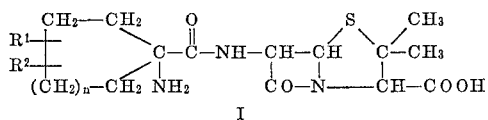

I wherein $n$ is an integer from 0 to 4, and $R^1$ and $R^2$ are each selected from the group consisting of hydrogen, lower alkyl, lower alkoxy, halogen and nitro; which method comprises:

(A) preparing a mixture of
 (1) an N-carboxyanhydride of the following formula:

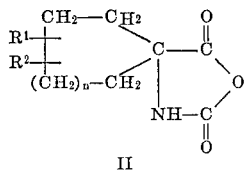

II wherein each of $n$, $R^1$ and $R^2$ have the same meaning as in Formula I above; and (2) 6-aminopenicillanic acid, in an anhydrous organic solvent of the group consisting of chlorinated hydrocarbons, ketones, esters, ethers having dissolved therein a soluble amine of the group consisting of di(lower)alkyl and tri(lower)alkyl amines; and (B) refluxing said mixture to obtain a compound of Formula I above.

2. A process for producing a 6-(1-aminocycloalkylcarboxamido)-penicillanic acid as defined in claim 1, wherein the N-carboxyanhydride is that of 1-amino-cyclohexane carboxylic acid.

3. A process for producing a 6-(1-aminocycloalkylcarboxamido)-penicillanic acid as defined in claim 1, wherein the N-carboxyanhydride is that of 1-aminocyclopentane carboxylic acid.

4. A process for producing a 6-(1-aminocycloalkylcarboxamido)-penicillanic acid as defined in claim 1, wherein the N-carboxyanhydride is that of 1-amino-cyclohexane carboxylic acid.

5. A process for producing a 6-(1-aminocycloalkylcarboxamido)-penicillanic acid, as defined in claim 1, wherein the N-carboxyanhydride is that of 1-aminocycloheptane carboxylic acid.

6. A process for producing a 6-(1-aminocycloalkylcarboxamido)-penicillanic acid as defined in claim 1, wherein the solvent is methylene chloride and the amine is triethylamine.

References Cited

UNITED STATES PATENTS 3,329,675   7/1967   Albuon et al. _____ 260—239.1

NICHOLAS S. RIZZO, Primary Examiner

PO-1050
(5/69)

UNITED STATES PATENT OFFICE
CERTIFICATE OF CORRECTION

Patent No. 3,538,083      Dated November 3, 1970

Inventor(s) Norman H. Grant, Donald E. Clark, Harvey E. Alburn

It is certified that error appears in the above-identified patent and that said Letters Patent are hereby corrected as shown below:

In column 1, line 55, "acknowledge" should read --acknowledged--
In column 3, line 20, "m" should read --ml--;
           line 48, "precipiate" should read --precipitate--;
           line 67, "produce" should read --product--.
In column 6, line 15, "1-amino-cyclohexane" should read --1-amino-cyclobutane--;
           line 27, "Alboun et al." should read --Alburn et al.--.

SIGNED AND SEALED
MAR 9 1971

(SEAL)
Attest:

Edward M. Fletcher, Jr.
Attesting Officer

WILLIAM E. SCHUYLER, JR.
Commissioner of Patents